J. MATTHEWS.
Apparatus for Filling Bottles.

No. 150,173.  Patented April 28, 1874.

Witnesses  Inventor

UNITED STATES PATENT OFFICE.

JOHN MATTHEWS, OF NEW YORK, N. Y.

IMPROVEMENT IN APPARATUS FOR FILLING BOTTLES.

Specification forming part of Letters Patent No. 150,173, dated April 28, 1874; application filed November 1, 1873.

*To all whom it may concern:*

Be it known that I, JOHN MATTHEWS, of the city, county, and State of New York, have invented certain new and useful Improvements in Apparatus for Filling Bottles; and I do hereby declare the following to be a full, clear, and exact description of the invention, such as will enable others skilled in the art to which it pertains to make and use it, reference being had to the accompanying drawings, which form a part of this specification, in which—

Figure 1:
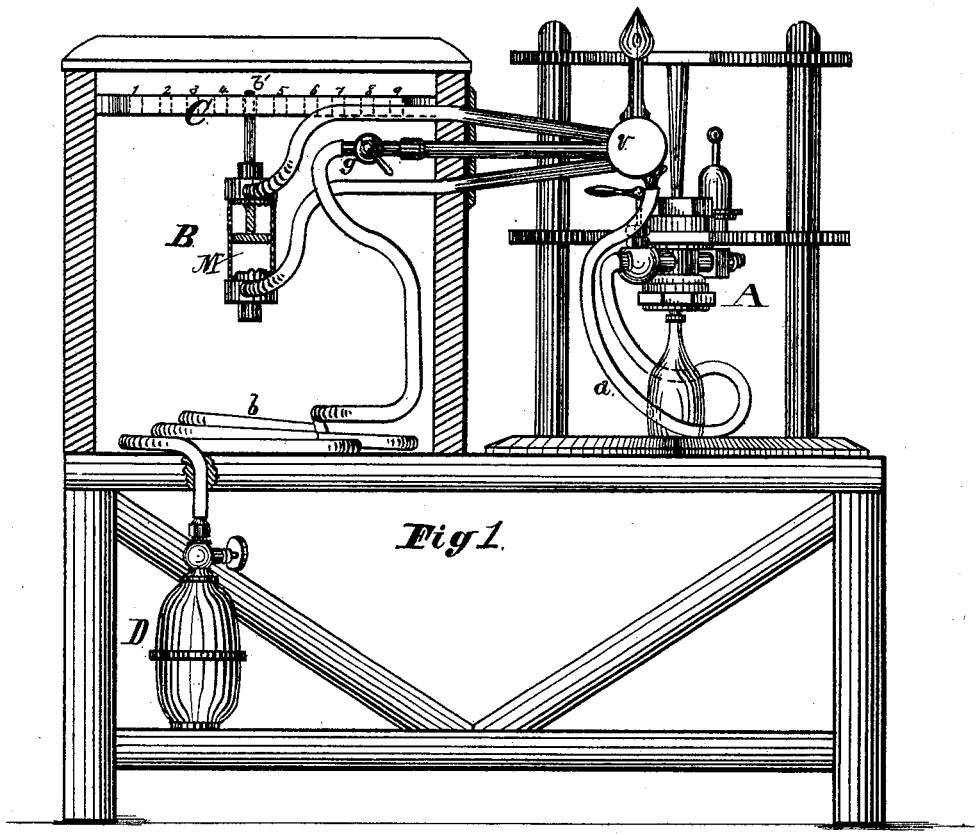
Figure 2:
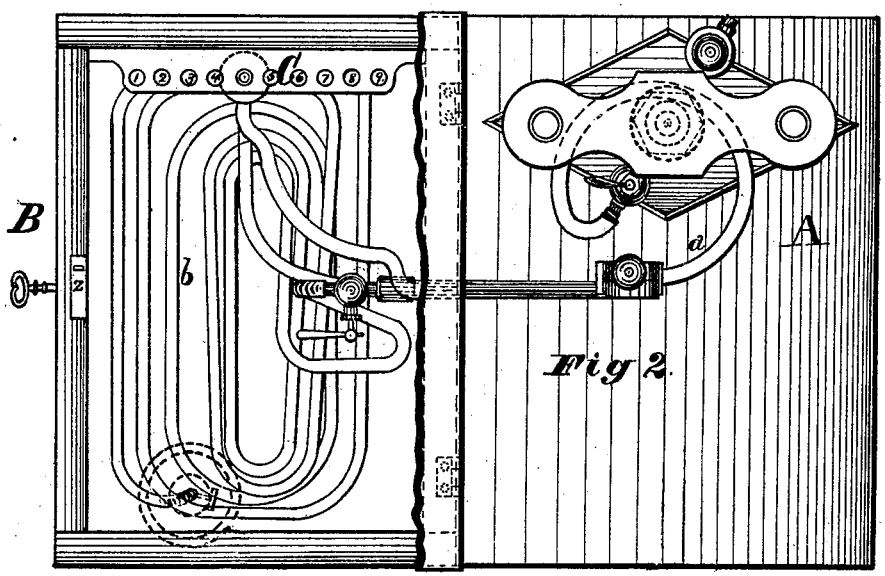

Figure 1 is a sectional elevation, and Fig. 2 a plan view.

The object of this invention is to measure into bottles the exact quantity of liquid required by means of the bottling-machine. In the bottling of ale and other beverages in stone or opaque bottles the person operating the machine has to guess at the quantity to be let in. In the hands of an expert workman this generally answers; but it is still a well-known fact that there is great inequality in the quantity of bottled liquids ordinarily put into the bottles. When the bottle is not sufficiently well filled with ale or beer, or wine, the air in the vacant space sometimes produces acetous fermentation, and thus the purchaser does not receive either the quantity or the quality of liquid to which he is entitled. My invention obviates these objections; and consists in combining with a bottling-machine a meter, and, where required, a meter and registering apparatus, so that the same quantity of liquid is introduced into each bottle, and the number of bottles filled is registered by the working of the machine.

This invention is a modification of that described in my patent dated July 22, 1873, No. 140,154. The devices for measuring and recording are substantially the same as in the invention covered by said patent, the special change, which is the subject of this specification, being the necessary changes and modifications required to adapt the principle of the former invention to the bottling-machine.

The following description will enable others to make and use my invention.

The right-hand portions of Figs. 1 and 2, marked A, show a bottling-machine of the usual construction, which, as it forms no part of this invention, and may be of the form shown, or any other answering the same purpose, need not be particularly described.

The tube $a$ connects with the outlet from valve $v$ of the reversible draft-arm. This draft-arm and its reversing-valve is the same as that fully described in my patent above mentioned. The middle branch is that which leads to the fountain or cask containing the liquid to be bottled, and is provided with a valve, $g$, so the flow of the liquid may be stopped in case of repair to the valve or the meter. The liquid passes through the middle branch, and, as the reversing-valve is turned the one way or the other, returns the liquid back through the upper or lower branch to the meter shown at the left-hand side of the drawings at M. B is a chest, which is made up of a cooling-chamber, with a coil, $b$, from the vessel D, containing the liquid to be bottled. In the upper portions of the cooling-chamber are placed the registering devices $b'$, which are substantially the same as mentioned in my patent named above. In the same chamber is placed the meter $m$, which, as shown, is composed of a cylinder with a piston similar to that of a reciprocating steam-engine, the liquid to be bottled acting first on one side and then on the other of the piston, thus causing the piston to move. The piston-rod is connected with suitable levers, pawls, and ratchet-wheels, to drive the registering apparatus. The moving of the reversing-valve permits the liquid to enter the meter alternately above and below, and the capacity of the meter is so adjusted as exactly to fill a bottle at each stroke of the piston. A stop-cock, $g$, is placed on the central branch of the reversing-valve, so as to shut off the liquid in case of repairs to the reversing-valve.

By connecting a cooling-chamber and coil with the bottling-machine the liquid is cooled before entering the machine, which relieves the pressure and prevents the loss of gas which would otherwise occur. This is a new feature of this kind of apparatus. When the liquid is bottled for immediate consumption, as certain kinds of liquids often are, the cooling previous to bottling is of great advantage.

I do not limit myself to the form of meter shown, as many other meters are now made which a skillful mechanic would readily adapt so as to take the place of that shown; nor do I limit myself to any form of cooler, registering-machine, bottling-machine, or draft apparatus, as all these may be changed without departing from the principle of my invention.

I am aware that graduated pumps have been used to pump into bottles a definite quantity of liquid. This I do not claim. My apparatus is automatic—that is, by simply being attached to the ordinary bottling-machine, the liquid, as it flows to the machine, is cooled and measured by passing through the meter and cooling-chamber, and the number of measures drawn registered by the recording devices. These devices, together with draft-arm and reversing-valve, being the same as described in my former patent, are not, therefore, more minutely described.

Having thus described my invention, what I claim, and desire to secure by Letters Patent of the United States, is—

1. The combination of an automatic meter with a bottle-filling machine, as and for the purpose set forth.

2. The combination of a cooling-chamber with the filling-head of a bottling-machine, between the fountain and the filling-head, so as to bottle aerated beverages under less pressure, as set forth.

3. The combination of a meter, a registering apparatus, and a bottling-machine, substantially as set forth.

In testimony that I claim the foregoing I have hereunto set my hand and seal this 15th day of August, 1873.

JOHN MATTHEWS. [L. S.]

Witnesses:
   FREDERICK STEELE,
   W. D. SLOAN.